United States Patent [19]
Akimoto

[11] Patent Number: 5,977,495
[45] Date of Patent: Nov. 2, 1999

[54] CONSTRUCTION OF COMBINATION SWITCH FOR VEHICLE

[75] Inventor: Hideaki Akimoto, Tokyo, Japan

[73] Assignee: Niles Parts Co., Ltd., Tokyo, Japan

[21] Appl. No.: 09/021,858

[22] Filed: Feb. 11, 1998

[30] Foreign Application Priority Data

Feb. 14, 1997 [JP] Japan ................................. 9-044893

[51] Int. Cl.⁶ ............................................... H01H 9/00
[52] U.S. Cl. ........................................... 200/61.54; 439/15
[58] Field of Search ............................ 200/5 A, 61.54, 200/5 R, 51.04, 51.06; 439/15, 164

[56] References Cited

U.S. PATENT DOCUMENTS

| | | | |
|---|---|---|---|
| 4,218,595 | 8/1980 | Honjo | 200/61.54 |
| 4,404,438 | 9/1983 | Honjo | 200/61.54 |
| 4,518,836 | 5/1985 | Woolridge | 200/61.54 |
| 4,760,218 | 7/1988 | Gutman | 200/5 R |
| 5,396,106 | 3/1995 | Chretien et al. | 307/10.1 |
| 5,747,763 | 5/1998 | Uchiyama et al. | 200/61.54 |
| 5,883,348 | 3/1999 | Yokoyama | 200/61.54 |

FOREIGN PATENT DOCUMENTS 63-196755  12/1988  Japan .

*Primary Examiner*—M. L. Gellner
*Assistant Examiner*—Lee S. Lum
*Attorney, Agent, or Firm*—Ronald P. Kananen; Rader, Fisherman & Grauer

[57] ABSTRACT

A combination switch for a vehicle which employs only one connector for electrical connections. A body is formed with a first recess and second recess formed on the left and right sides of the body, respectively. A first switch is mounted to the first recess, and a second switch is mounted to the second recess. A terminal block is mounted to the body between the first and second switches. The terminal block electrically connects the first switch and the second switch. An electrical connector is provided on either the first switch or the second switch for connecting to an external connector.

17 Claims, 3 Drawing Sheets

CONSTRUCTION OF COMBINATION SWITCH FOR VEHICLE

BACKGROUND OF THE INVENTION

1. Field of the Invention

The present invention relates to a construction of a combination switch for a vehicle having a body to which first and second switches are mounted. More particularly, the present invention relates to a construction of a combination switch for a vehicle wherein a connector for receiving electric power from an external power supply is mounted either on the first switch or on the second switch.

2. Description of Prior Art

A conventional combination switch is disclosed, for example, in Japanese Utility Model Preliminary Publication (JITSUYO KOKAI) No. 63-196755. The conventional combination switch has a construction wherein a switch unit having a coupler for lighting and a switch unit having a coupler for wipers and other couplers are secured by bolts to a switch body. A horn shoe provided on the switch body is connected to a connection of one of the switches, and the lighting coupler side of the switch unit is connected primarily to the power supply.

However, the conventional combination switch has a plurality of couplers for each of the two switch units, one of the switch units being on the left side of the body and the other on the right side. This construction includes many couplers which require a large number of parts and a longer time for electrical wiring. Thus, this construction is responsible for high manufacturing and assembly cost.

SUMMARY OF THE INVENTION

An object of the present invention is to provide a construction of a combination switch for a vehicle that solves the problems associated with the conventional combination switch described above.

More specifically, an object of the present invention is to provide a combination switch for a vehicle which employs only one connector for electrical connections.

A combination switch for a vehicle is disclosed that employs only one connector for electrical connections. The combination switch has a body with a first recess and a second recess formed on the left and right sides thereof, respectively. A first switch is mounted to the first recess, and a second switch is mounted to the second recess. A terminal block is mounted to the body between the first and second switches. The terminal block electrically connects the first switch and the second switch. An electrical connector is provided on either the first switch or the second switch.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention. In the drawings.

DETAILED DESCRIPTION OF THE INVENTION

Figure 1:
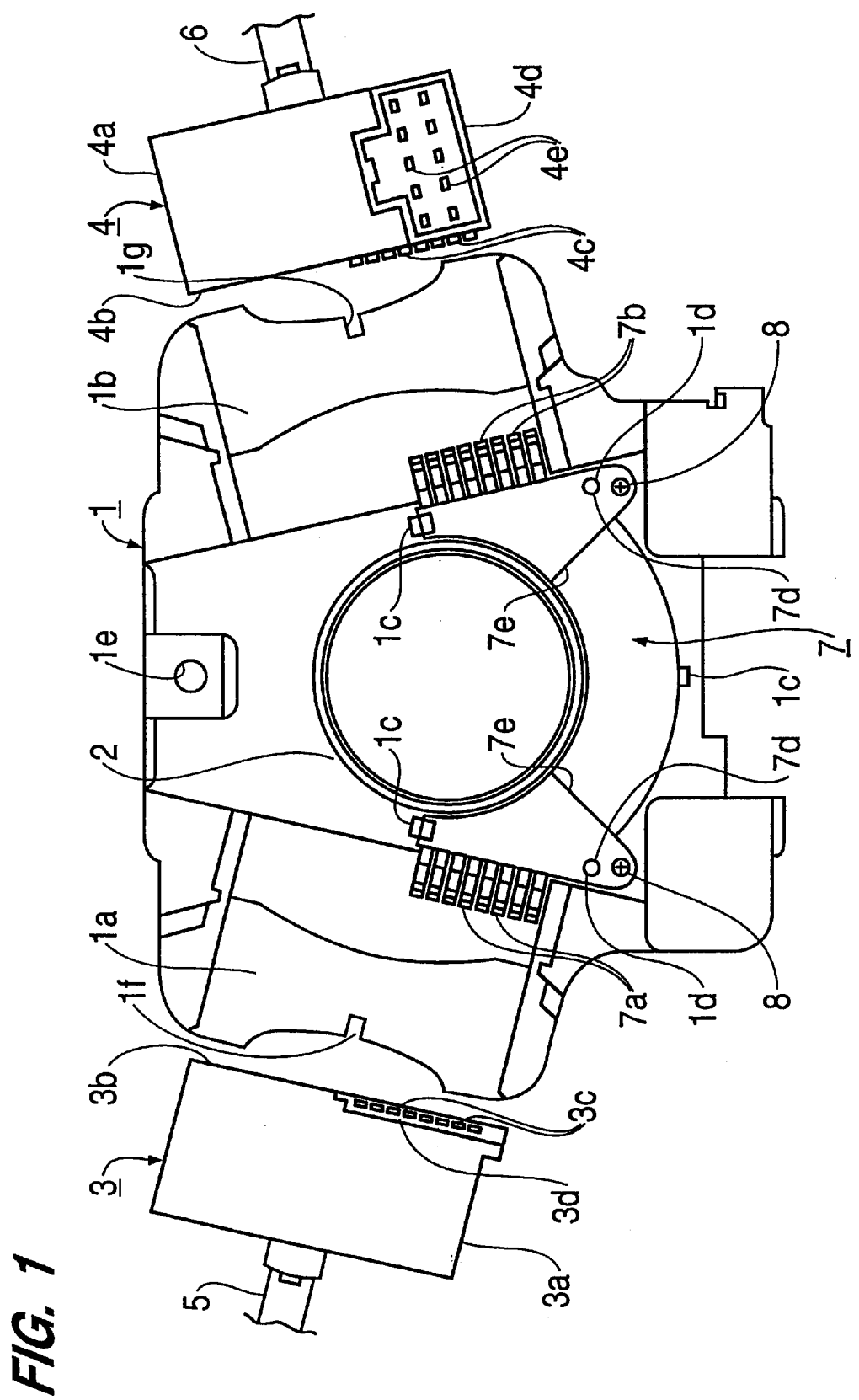
FIG. 1 is a bottom view of a combination switch of he present invention.

A preferred embodiment of the invention will now be described in detail with reference to FIGS. 1 to 4 of the accompanying drawings.

A body 1 of a combination switch for use in an automobile is fixed to a steering column (not shown) by bolts. The body has a first recess 1a on its left side, a second recess 1b on its right side, and a central opening defined by a cylindrical pipe 2 that extends through the middle of the body 1. The first recess 1a receives a first switch 3 inserted thereinto from the left, and the second recess 1b receives a second switch 4 inserted thereinto from the right.

Figure 2:
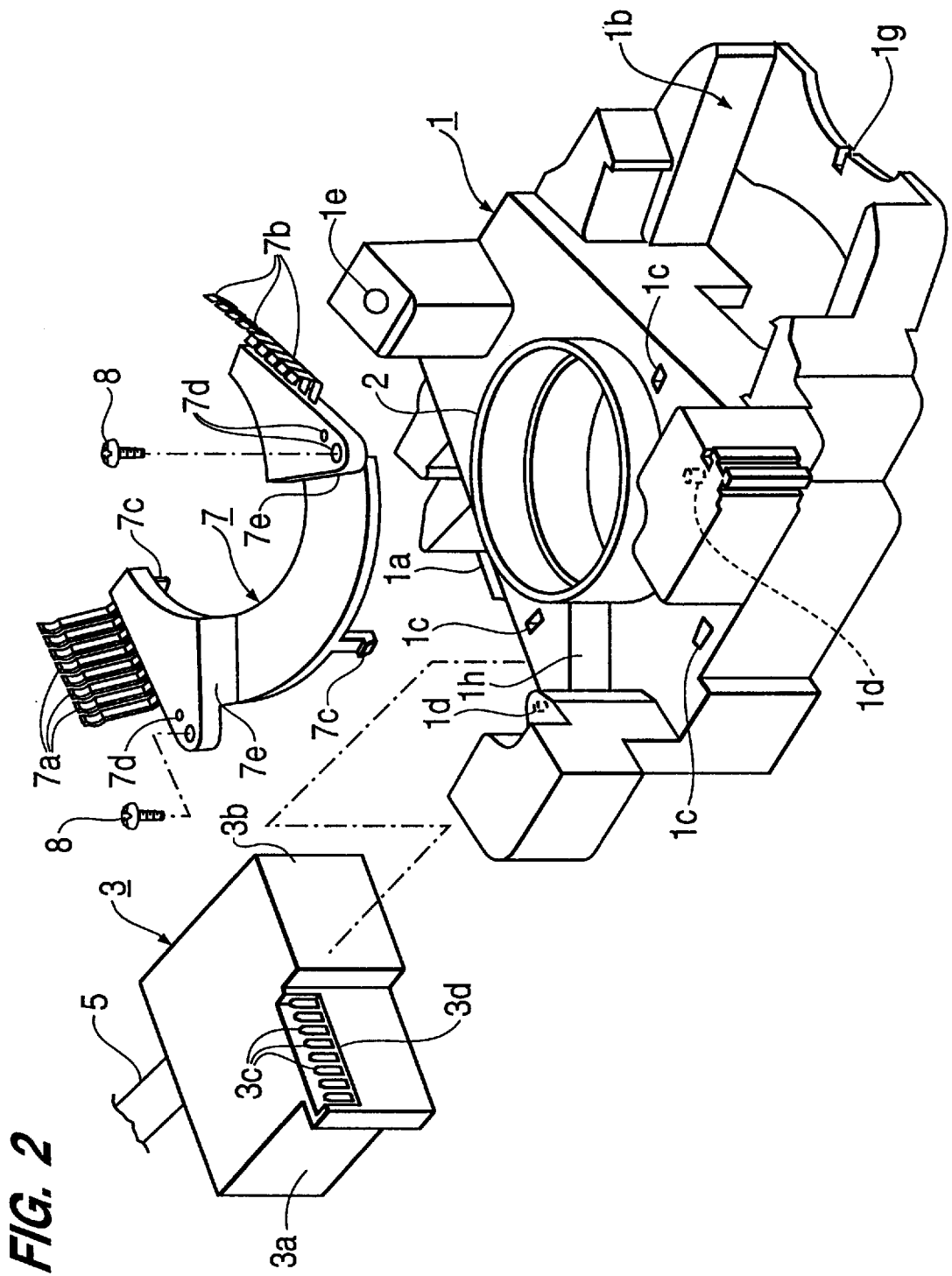
FIG. 2 is an exploded perspective view of the combination switch shown in FIG. 1.
Figure 3:
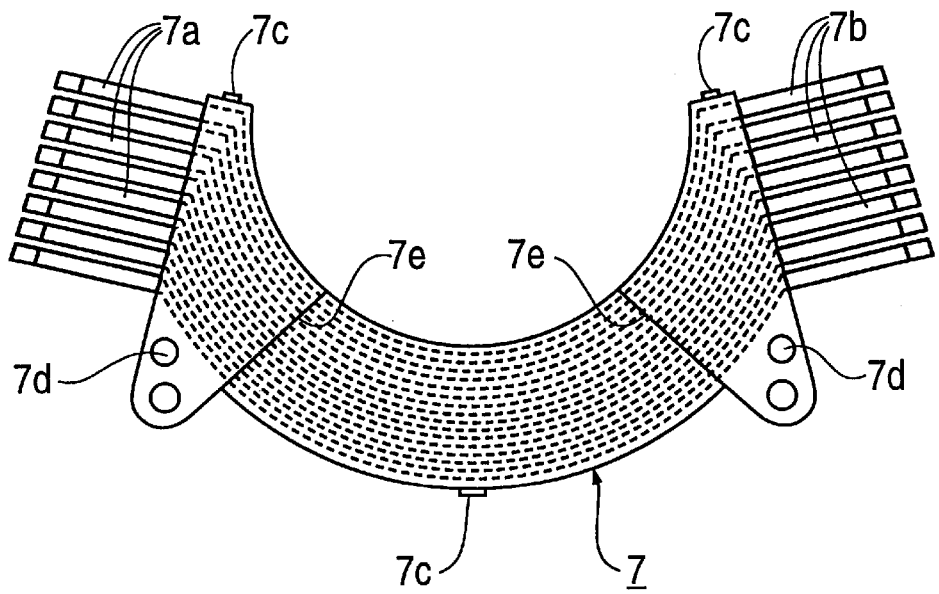
FIG. 3 illustrates a terminal block used in the combination switch.

The first and second recesses 1a and 1b are formed in the left and right undersides of the body 1, as shown in FIGS. 1 and 2, and a terminal block 7 having contacts 7a and 7b is securely assembled to the body 1 between the first and second recesses 1a and 1b. The body 1 is formed with a plurality of fastening holes 1c into which resilient fastening projections 7c are pushed into a locking engagement. The body 1 is also formed with two projections 1d that extend into positioning holes 7d formed in the terminal block 7.

The body 1 is bolted to the steering column (not shown) by inserting a bolt through a hole 1e. Positioning cutouts if and 1g are formed in the middle of the outermost ends of the first and second recesses 1a and 1b, respectively, and are engaged with projections 3e formed on switch cases 3a and 4a.

The first switch 3 performs the functions of, for example, a turn signal switch, a passing switch, a main/dimmer selector switch, a head lamp switch, and a fog lamp switch.

For the function of the turn signal switch, a flasher lamp cycles on and off when an operating lever 5 is operated in the left and right directions.

For the function of the passing switch, the head lamps come on momentarily when the operating lever 5 is operated upwardly and held there.

For the function of the main/dimmer switch, the head lamps can be switched between the main illumination mode and dimmer illumination mode by operating the lever 5 upwardly or downwardly.

For the function of the head lamp switch, when a rotatable knob (not shown) attached to a free end of the operating lever 5 is rotated, the head lamps and small lamps are selectively caused to come on and off.

The first switch 3 has a plurality of contacts 3c on the switch case 3a, the contacts 3c being arranged in substantially the same plane as the end surface 3b of the switch case 3a close to the body 1. The contacts 3c contact the contacts 7a of the terminal block 7 when the first switch 3 is mounted to the body 1. The contacts 3c project vertically in parallel with stepped surface 3d formed on the first switch 3 adjacent to the end surface 3b. The contacts 3c are electrically connected to fixed contacts (not shown) provided in the switch case 3a and movable contacts (not shown) provided in the operating lever 5. The contacts 4c are electrically continuous to a connector 4d formed in the switch case 4a via the contacts 7a and 7b.

The contacts 3c are made of a conductive metal material and are fixedly assembled near the end surface 3b of the switch case 3a by, for example, resin insert-molding or caulking. The stepped surface 3d is not essential. The contacts 3c may be exposed in the same plane as the end surface 3b so that larger portions of the contacts 3c are exposed.

The switch case 3a is fixed to the body 1 by screws or other fastening means, such as engagement projections formed on resilient fastening projections. The switch case 3a does not have a connector therein.

The second switch 4 has substantially the same construction as the first switch 3 and is arranged on the body 1 as a mirror image of the first switch 3. An operating lever 6 is pivotally journaled to the second switch 4 and operated to control the functions of, for example, wiper/washer switches. The operating lever 6 is operated in the upward and downward directions and in the left and right directions just as the operating lever 5. The operating lever 6 has, at its tip portion, a wiper volume and rear wiper switch in the form of a rotary switch.

The second switch 4 has a plurality of contacts 4c in substantially the same plane as the end surface 4b of the switch case 4a close to the body 1. The contacts 4c are electrically continuous to the fixed contacts (not shown) in the switch case 4a of the second switch 4 and movable contacts (not shown) in the operating lever 6. The contacts 4c are made of, for example, an electrically conductive metal material and are fixedly assembled near the end surface 4b of the switch case 4a by, for example, resin insert-molding or caulking.

The switch case 4a is fixed to the body 1 by screws or engagement projections formed on the resilient fastening projections. The switch case 4a is formed with a connector 4d on its underside. Terminals 4e of the connector 4d are electrically continuous to the contacts 4c, fixed contacts in the switch case 4a, fixed contacts in the operating lever 6, and horn terminals (not shown).

The connector 4d may be arranged on either of the underside and side surface of the switch case 4a. In addition, it is sufficient that the connector 4d is provided only on one of the switch cases 3a and 4a and may be provided in either of the switch case 3a and switch case 4a.

The terminal block 7 electrically connects between the first switch 3 and the second switch 4, which are arranged on the left and right sides of the body 1, respectively. The terminal block 7 is a flat plate-like member of a substantially arcuate shape with an inner arcuate side complementary to or configured to the outer surface of the cylindrical pipe 2. The terminal block 7 has contacts 7a and 7b outwardly projecting therefrom at its left and right longitudinal ends, respectively. The terminal block 7 has stepped portions 7e at positions where the terminal block 7 is defined into three parts, as shown in FIG. 2. The stepped portions 7e abut stepped portions 1h of the body 1 when assembled to the body 1.

The terminal block 7 is mounted to the body 1 with the inner arcuate side fitting to the outer surface of the cylindrical pipe 2 between the first and second recesses 1a and 1b. The terminal block 7 is thereby in a complementary engagement with the cylindrical pipe 2. Then, the terminal block 7 is fixed to the body 1 by a plurality of resilient projections 7c and a pair of bolts 8, 8. The terminal block 7 is detachably mounted to the body 1 so that the terminal block 7 may be replaced. The terminal block 7 is insert-molded from a resin using the contacts 7a and 7b as inserts. Alternatively, the contacts 7a and 7b may be caulked to the terminal block 7.

The contacts 7a and 7b are made from a sheet of electrically conductive, resilient flat metal material by pressing. The contacts 7a and 7b project from the left and right ends of the terminal block 7 and are bent at an obtuse angle somewhat away from the end walls 3b and 4b of the first and second recesses 1a and 1b, so that the contacts 7a and 7b are resilient in the direction toward the end surfaces 3b and 4b. Upon fixedly assembling the terminal block 7 to the body 1, the contacts 7a and 7b are positioned near the end walls of the first and second recesses 1a and 1b. The free end portion of the contacts 7a and 7b extend slightly in a direction away from the end walls of the first and second recesses 1a and 1b, respectively.

As far as the contacts 7a and 7b and the contacts 3c and 4c move into contact engagement with each other when the switch cases 3a and 4a fit into the first and second recesses 1a and 1b, the contacts 7a and 7b and contacts 3c and 4c may be arranged in any planes. For example, the contacts 7a and 7b may be arranged in the first and second recesses 1a and 1b, respectively, and the contacts 3c and 4c may be arranged in the side surface switch cases 3a and 4a, respectively.

The contacts 7a and 7b may be formed on the surface of the end walls of the first and second recesses 1a and 1b, respectively, just as fixed contacts are formed on a circuit board. In such a construction, the contacts 3c and 4c in contact with the contacts 7a and 7b should take the form of slidable contacts.

The operation and assembly steps of the invention will now be described in detail.

When assembling, the terminal block 7 is positioned relative to the cylindrical pipe 2 with the projections 1d extending through the positioning holes 7d, and then the terminal block 7 is depressed against the underside of the body 1.

Assembling the terminal block 7 beside the cylindrical pipe 2 automatically places the terminal block 7 in position a predetermined distance away from the center of the cylindrical pipe 2. When the two stepped portions 7e engage the stepped portions 1h, and the projections 1d extend into the positioning holes 7d, the terminal block 7 is positioned with respect to the body 1.

When the terminal block 7 is pressed against the body 1, the resilient projections 7c engage the fastening holes 1c so that the terminal block 7 is fixed to the body 1. The terminal block 7 is further rigidly fastened to the body 1 by the bolts 8. Thus, the whole assembly will not rattle at all in any case.

Figure 4:
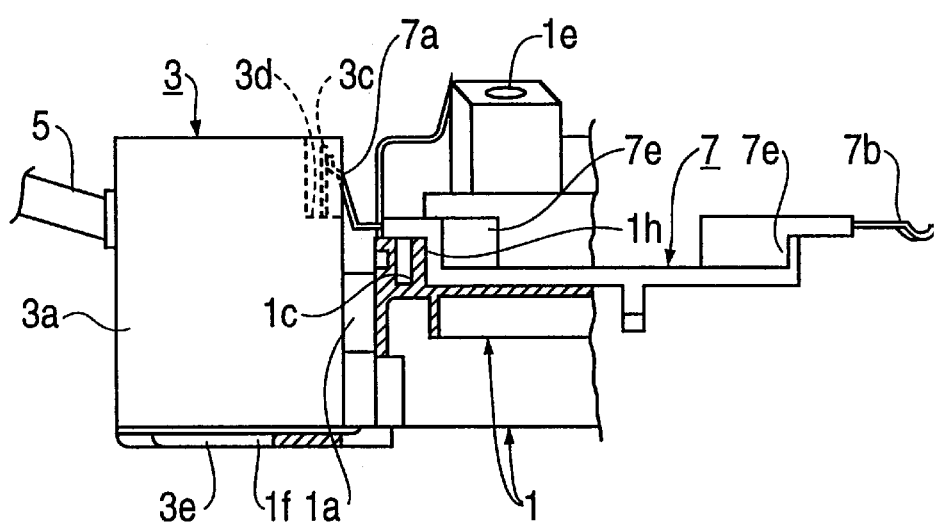
FIG. 4 is a side view of the combination switch of the present invention, showing the terminal block assembled to the combination switch.

The first switch 3 is assembled into the first recess 1a, and the second switch 4 is assembled into the second recess 1b. When the projections 3e fit into the positioning cutouts 1f and 1g, the switch cases 3a and 4a are positioned in place with respect to the body 1, respectively. As shown in FIG. 4, the contacts 3c and 4c press the contacts 7a and 7b, so that the contacts 7a and 7b are deformed into pressure contact with the contacts 3c and 4c.

Thus, electrical connections are made between the contacts 3c and the contacts 7a and between the contacts 4c and contacts 7b. This implies that electrical connections may be made without using connectors or soldering. The connector 4d may be formed in either of the first switch 3 or in the second switch 4, so that electric power may be supplied from an external supply via the connector 4d. The body 1 is fixed to the steering column by bolts.

Electric power is directed from outside to the first and second switches 3 and 4 by connecting an external connector to the connector 4d, so that the combination switch can function properly. The combination switch of the present invention, equipped with the first switch 3 and second switch 4, receives electric power via only one location or connector 4d. This construction minimizes the time required for wiring. In addition, this combination switch requires fewer parts and is less expensive to manufacture.

The first and second switches receive electric power through a single connector provided either on the first switch or on the second switch. This construction is effective in reducing the number of parts and the time required for assembling a combination switch. Simply inserting the first and second switches into the corresponding recesses establishes electrical connection between the first and second switches.

The provision of only one electrical connector allows electrical power to be supplied to all the switches built in the combination switch assembly, thereby reducing the number of parts and the time required for wiring.

The construction eliminates manufacturing operations such as soldering and wiring.

The detachably assembled terminal block is advantageous in that the terminal block may be quickly replaced when trouble occurs in the multiple contacts.

The shape of the terminal block complementary to the cylindrical pipe allows easy and accurate positioning of the terminal block with respect to the body.

The contacts of the terminal block are resilient and provide pressure contact engagement between the contacts of the terminal block and the contacts of the first and second switches, thereby ensuring electrical connections.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A combination switch for mounting on a steering column of a vehicle, the combination switch comprising:
   a body having a central opening extending therethrough;
   a first recess formed on a left side of said central opening;
   a second recess formed on a right side of said central opening opposite from said first recess;
   a first switch mounted to said body in said first recess;
   a second switch mounted to said body in said second recess;
   first and second groups of contacts, said first group of contacts being arranged on said first switch and said second group of contacts being arranged on said second switch; and
   a terminal block mounted to said body between said first switch and said second switch, said terminal block providing electrical communication between said first group of contacts and said second group of contacts for electrically connecting said first switch and said second switch.

2. The combination switch of claim 1, wherein an electrical connector for connecting to an external connector is provided on only one of said first switch and said second switch.

3. The combination switch of claim 2, further comprising third and fourth groups of contacts, wherein said first group of contacts is arranged on said first switch in a plane substantially normal to a first direction in which said first switch is inserted into said body, said second group of contacts is arranged on said second switch in a plane substantially normal to a second direction in which said second switch is inserted into said body, said third group of contacts is arranged on said terminal block in pressure contact with said first group of contacts, and said fourth group of contacts is arranged on said terminal block in pressure contact with said second group of contacts.

4. The combination switch of claim 3, wherein the first group of contacts is arranged in a leading end surface with respect to the first direction;
   the second group of contacts is arranged in a leading end surface with respect to the second direction;
   the third group of contacts is arranged at an innermost wall of said first recess with respect to the first direction, and is in pressure contact with the first group of contacts; and
   the fourth group of contacts is arranged at an innermost wall of said second recess with respect to the second direction, and is in pressure contact with the second group of contacts.

5. The combination switch of claim 4, wherein said terminal block is detachably mounted to said body.

6. The combination switch of claim 5, wherein said body includes a cylindrical pipe, said first and second recesses are formed on opposite sides of said cylindrical pipe, and said terminal block is shaped to be complementary to an outer periphery of the cylindrical pipe so that the terminal block is in a complementary engagement with the cylindrical pipe when assembled to the body.

7. The combination switch of claim 6, wherein said terminal block has substantially opposite longitudinal ends, and said third group of contacts and said fourth group of contacts project from the longitudinal ends away from each other;
   wherein said third group of contacts and said fourth group of contacts are flat springs made of an electrically conductive, resilient metal material and are bent at free end portions thereof so that free ends of the third group of contacts and free ends of the fourth group of contacts are in planes close to the innermost walls of said first recess and said second recess, respectively.

8. The combination switch of claim 1, further comprising third and fourth groups of contacts, wherein said first group of contacts is arranged on said first switch in a plane substantially normal to a first direction in which said first switch is inserted into said body, said second group of contacts is arranged on said second switch in a plane substantially normal to a second direction in which said second switch is inserted into said body, and said third group of contacts is arranged on said terminal block in pressure contact with said first group of contacts, and said fourth group of contacts is arranged on said terminal block in pressure contact with said second group of contacts.

9. The combination switch of claim 8, wherein the first group of contacts is arranged in a leading end surface with respect to the first direction;
   the second group of contacts is arranged in a leading end surface with respect to the second direction;
   the third group of contacts is arranged at an innermost wall of said first recess with respect to the first direction, and is in pressure contact with the first group of contacts; and
   the fourth group of contacts is arranged at an innermost wall of said second recess with respect to the second direction, and is in pressure contact with the second group of contacts.

10. A combination switch for mounting on a steering column of a vehicle, the combination switch comprising:

a body;

a first recess formed on a left side of said body;

a second recess formed on a right side of said body;

a first switch mounted to said first recess;

a second switch mounted to said second recess; and a terminal block mounted to said body between said first switch and said second switch, said terminal block electrically connecting said first switch and said second switch;

wherein said terminal block has substantially opposite longitudinal ends, and said third group of contacts and said fourth group of contacts project from the longitudinal ends away from each other; and wherein said third group of contacts and fourth group of contacts are flat springs made of an electrically conductive, resilient metal material and are bent at free end portions thereof so that free ends of the third group of contacts and free ends of the fourth group of contacts are in planes close to the innermost walls of said first recess and said second recess, respectively.

11. The combination switch of claim 1, wherein said terminal block is detachably mounted to said body.

12. The combination switch of claim 1, wherein said body includes a cylindrical pipe, said first and second recesses are formed on opposite sides of said cylindrical pipe, and said terminal block is shaped to be complementary to an outer periphery of the cylindrical pipe so that the terminal block is in a complementary engagement with the cylindrical pipe when assembled to the body.

13. A combination switch for mounting on a steering column of a vehicle, comprising:

a body having a central opening and first and second recesses formed on opposite sides of said central opening, respectively;

a first switch mounted to said first recess;

a first group of electrical contacts, said first group of electrical contacts being arranged on said first switch;

a second switch mounted to said second recess;

a second group of electrical contacts, said second group of electrical contacts being arranged on said second switch;

an electrical connector formed on said second switch for connecting to an external connector, said electrical connector having terminals that are electrically continuous to the second group of electrical contacts;

a terminal block mounted to said body between said first switch and said second switch;

a third group of electrical contacts, said third group of electrical contacts projecting from a first longitudinal end of said terminal block in pressure contact with said first group of electrical contacts; and a fourth group of electrical contacts, said fourth group of electrical contacts projecting from a second longitudinal end of said terminal block in pressure contact with said second group of electrical contacts, said terminal block and said first, second, third and fourth groups of electrical contacts providing electrical communication between said first switch and said electrical connector formed on said second switch.

14. The combination switch of claim 13, wherein said first group of contacts is arranged in a plane substantially normal to a first direction in which said first switch is inserted into said body, and said second group of contacts is arranged in a plane substantially normal to a second direction in which said second switch is inserted into said body.

15. The combination switch of claim 14, wherein the first group of contacts is arranged in a leading end surface of said first switch with respect to the first direction;

the second group of contacts is arranged in a leading end surface of said second switch with respect to the second direction;

the third group of contacts is arranged at an innermost wall of said first recess with respect to the first direction, and is in pressure contact with the first group of contacts; and the fourth group of contacts is arranged at an innermost wall of said second recess with respect to the second direction, and is in pressure contact with the second group of contacts.

16. The combination switch of claim 15, wherein said body includes a cylindrical pipe defining said central opening, and said terminal block is shaped to be complementary to an outer periphery of the cylindrical pipe so that the terminal block is in a complementary engagement with the cylindrical pipe when assembled to the body.

17. The combination switch of claim 16, wherein said third group of contacts and said fourth group of contacts are flat springs made of an electrically conductive, resilient metal material and are bent at free end portions thereof so that free ends of the third group of contacts and free ends of the fourth group of contacts are in planes close to the innermost walls of said first recess and said second recess, respectively.

* * * * *